United States Patent [19]
Parkinson

[11] 3,829,220
[45] Aug. 13, 1974

[54] GAUGING DIMENSIONS

[75] Inventor: Geoffrey John Parkinson, Stapleford, England

[73] Assignee: T. I. (Group Services) Limited, Birmingham, England

[22] Filed: Mar. 16, 1973

[21] Appl. No.: 342,277

[30] Foreign Application Priority Data
Mar. 17, 1972 Great Britain.................... 12494/72

[52] U.S. Cl.................. 356/160, 356/167, 250/571
[51] Int. Cl. .......................................... G01b 11/04
[58] Field of Search.................. 356/160, 167, 169; 250/219 WD, 571

[56] References Cited
UNITED STATES PATENTS

| | | | |
|---|---|---|---|
| 3,224,322 | 12/1965 | Westbrook...................... | 356/160 X |
| 3,371,335 | 2/1968 | Seewald.............................. | 356/169 |
| 3,615,139 | 10/1971 | Bostrom............................. | 356/160 |
| 3,743,428 | 7/1973 | Brown................................ | 356/160 |
| 3,744,915 | 7/1973 | Sick .................................. | 356/160 |

*Primary Examiner*—John K. Corbin
*Assistant Examiner*—Paul K. Godwin
*Attorney, Agent, or Firm*—Scrivener Parker Scrivener & Clarke

[57] ABSTRACT

A profile gauge in which two beams are scanned in unison, one of them being scanned in a parallel manner across an object being measured and producing a profile signal in a first light detector, and the other being scanned in a parallel across a diffraction grating which transmits light that produces a pulsed measuring signal in a second light detector, one pulse being produced for each line spacing interval of the grating traversed by the second beam and these measuring pulses being produced continuously during scanning so as to permit direct measurement of the width of the object by summing those pulses occuring when the first beam is interrupted by the object. Preferably, the second beam is a monochromatic beam and an additional diffraction grating is provided in the path of said second light beam before it is scanned across the first grating so that diffraction of the light in both gratings causes a first order diffraction spot to be focussed onto a detection plane, which spot is used to produce said pulsed measuring signal. Further, the two light beams are preferably scanned by the same scanning means which comprises a parallel sided block of regular cross-section which is rotated about an axis through its centre parallel to its sides and which refracts the beams directed normal to its axis of rotation.

15 Claims, 7 Drawing Figures

GAUGING DIMENSIONS

This invention relates to profile gauges of the kind in which a light beam is used to measure the width of the profile of articles and rod material such as wire and tubing.

A profile gauge of this kind is known in which a fine laser beam is scanned across rod material from one side to the other in a parallel manner so that its direction remains substantially constant, and in which the time for which the beam is interrupted by the rod material as detected by a photodetector on the opposite side of the material from the laser is measured by timing means to give a measure of the diameter of the rod material. A rotating mirror block and lens system scans the laser beam and the timing means comprises a crystal controlled clock and high-speed counting system controlled by the signal from the photo-detector.

The advantages of this known profile gauge over other known non-scanning profile gauges are that it does not rely on the use of a measuring scale and can operate automatically over a wide measuring range, the second of these advantages being especially important as it allows the gauge to be used for constant monitoring of rod material.

However, it possesses the disadvantage that it is difficult to arrange that the measured time period in which the beam is interrupted is reliably and accurately related to a corresponding rod diameter. A nonuniform scan speed such as will be given by simple optical system and variations in the speed of rotation of the mirror block will produce errors unless the timing means is especially adapted to compensate for such variations, but then the necessary adaptations make the timing means complex and increase the overall cost of the gauge. The only alternative is to use a more complex optical system but this again only serves to increase the cost of the gauge.

A profile gauge has been proposed in German OLS Pat. No. 1,623,316 which overcomes the disadvantage of the scanning profile gauge described above by employing an optical grid or grating which is disposed behind the material in a plane normal to the beam and with its openings or lines perpendicular to the scanning path of the beam so that during a complete scan the beam is incident on the material and portions of the grating on each side of the material thereby throwing a shadow of the material onto the grating. The width of this shadow is the same as that of the material in the profile plane normal to the beam and is calculated from a count of the total number of grating lines which are scanned by the beam in said portions of the grating on each side of the shadow. A group of optic fibres is associated with each line and a light pulse is produced in each of these groups of fibres as the beam passes over them, the pulses produced during a complete scan being summed to give the required total count.

The use of the grating in this profile gauge results in the production of measuring pulses which are each directly related to a unit displacement of the beam across the grating and profile plane, and width measurements derived using these pulses are necessarily independent of the scanning speed. Thus, the gauge does not suffer from scanning speed error as does the aforementioned scanning profile gauge.

However, this gauge is subject to other disadvantages The design of the gauge is such that it only allows indirect measurement of the width of material by subtracting the width of the measured border portions from a predetermined total scan width. Also, the beam is a finely collimated beam with a small diameter of about 1 millimetre, comparable to that of the periodic spacing of the lines on the grating, so that the light pulses are produced one at a time at spaced intervals thereby permitting accurate measurements. This fact causes a problem in that dirt on the grating is likely to seriously interfere with the transmission of light to the optic fibres and thereby to interfere with the production of the light pulses. The use of a larger diameter beam would overcome this problem, but as visualised in the German OLS Pat. No. 1,623,316 a larger diameter beam would require a correspondingly larger periodic spacing of the grating lines with the result that less accurate measurements can be made using the gauge. Further a larger diameter beam would not give as sharp a cut-off of the beam at the edges of the material as a finer diameter beam, and this further contributes to less accurate measurements. This last difficulty cannot be readily overcome by focussing of the beam in the profile plane as this will then have an effect on the beam as incident on the grating.

The object of the present invention is to provide a profile gauge which employs a grating to produce measuring pulses but which does not suffer from the above mentioned disadvantages of the known profile gauge of this kind, namely, the disadvantages of not allowing direct measurement of the width of material and not allowing the use of a large diameter beam as incident on the grating without any corresponding loss of accuracy in the width measurements.

This object is achieved according to the present invention by using two scanning beams instead of one and arranging that a first beam scans the material and produces a profile signal in a first detector and the second beam scans in synchronism with the first beam and scans a diffraction grating so as to produce a pulsed measuring signal in a second detector, one pulse being produced for each line spacing interval of the grating traversed by the second beam and these measuring pulses being produced continuously during scanning.

The use of the two beams according to the invention results in continuous generation of measuring pulses by the second beam which in turn permits direct measurement of the width of the material by summing those pulses occurring when the first beam is interrupted, as indicated by the fall in the profile signal.

Further, the use of two separate beams to produce separate profile and pulsed measuring signals allows each of these beams to be operated on independently so as to obtain the best possible performance from each of them in the different functions which they perform. In particular, the second beam can be operated on as described below to avoid the effect of dirt on the grating and yet still make full use of a small line spacing interval on the grating for accurate measurements.

The above results are achieved by forming a collimated monochromatic second beam, passing it through a first diffraction grating, scanning the beam so that it scans a second diffraction grating in a parallel manner normal to the grating, and then focusing the beam onto a detection plane. The line spacing interval of both gratings are the same and the diameter of the initial beam is much larger than the line spacing interval so that the light spot produced by the beam on the first grating covers many lines of that grating. Under these conditions diffraction effects caused by each of the gratings as the beam passes through them results in a diffraction spectrum being produced in the detection plane comprising a number of different order diffraction spots. The first order diffraction spot is used to produce the pulsed measuring signal by arranging a photo-detector to collect the light forming the spot. This signal has a periodic interval corresponding exactly to that of the gratings, a measuring pulse being produced each time the scanned beam moves across the second diffraction grating by one line spacing interval.

Thus, the same correlation between the scanning movement of the beam across the diffraction grating and the pulsed measuring signal is obtained as in the known profile gauge which employs a diffraction grating, but there is the important difference that the beam diameter in the known gauge is of similar dimensions to the grating line spacing interval whereas in the proposed gauge the beam diameter is many times greater than the grating line spacing interval. As a consequence small particles of dirt on either of the gratings of the proposed gauge have no substantial effect.

According to a further feature of the invention the two beams are scanned by the same optical scanning means in order to ensure that the beam scan in unison. Preferably, the scanning means takes the form of a parallel sided light refracting block of regular cross-section which is rotated about an axis perpendicular to and through the centre of its cross-section. A beam directed at the side faces of the block in a fixed direction through the axis of rotation and at right angles to said axis, is refracted by the block but thereafter always continues in a direction parallel to the original fixed direction. Further, as the block rotates the beam is refracted by progressively differing amounts so that the final transmitted beam is displaced laterally from the axis of rotation by corresponding differing amounts and thus scans in a parallel manner. A second beam directed at the block in a second fixed direction through the axis of rotation of the block, perpendicular to the axis of rotation, and at a suitable angle to the direction of the first beam is scanned in a similar manner to, and in unison with the first beam but continues on in said second direction at an angle to the first beam. With a block of square cross-section the two beams are directed at the axis of rotation of the block in mutually perpendicular directions.

The above described method of scanning two beams in unison using a rotating block is an extremely simple way of achieving this result. Further, it has the advantage that it automatically compensates for measuring errors resulting from optical imperfections in the block so that averaging of successive measurements produces a more accurate result. This self-compensating effect occurs because each face of the block in turn refracts one beam and then the other, and will if imperfect, cause similar refraction errors in each case, but these refraction errors are found to result in measurement errors in an opposite sense in each case so that they cancel one another on being averaged.

The invention will now be described by way of example with reference to the accompanying drawings, in which.

Figure 1:
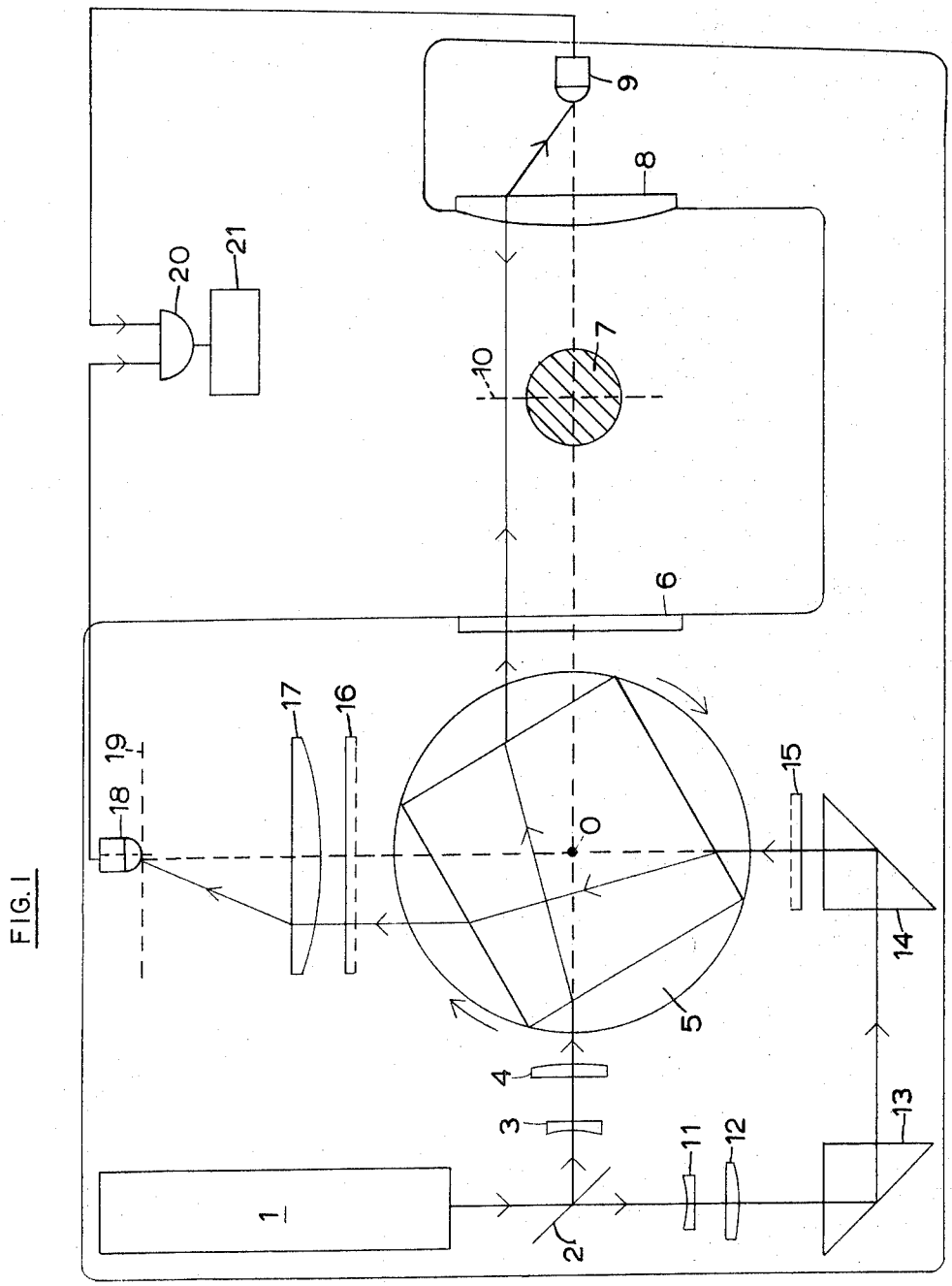
FIG. 1 is a plan view of a profile gauge according to one embodiment of the invention.

In the gauge of FIG. 1 a laser 1 produces a collimated monochromatic light beam of 6328A wavelength. This beam is divided into two beams by a beam splitter plate 2. A first beam is directed along a first axis passing through two lenses 3, 4 and the central axis of rotation 0 of a square section glass block 5. The beam may be refracted as it passes through the glass block 5 depending on the angular orientation of the block at any particular time, but it is always transmitted in a direction parallel to said first axis and passes through a window 6. Further, the glass block refracts the beam by differing amounts as it is rotated so that the transmitted beam is scanned across the window 6 from one side of said first axis to the other for each quarter revolution of the block 5. The beam passing through the window 6 is thus scanned in a parallel manner across a measuring space in which a rod 7 is positioned and this beam is focused by a lens 8 onto a photo-detector 9 if it is not interrupted by the rod. The glass block 5 is rotated by a synchronous motor (not shown) which operates from a 50 Hz supply and typically rotates the block at a speed of 6,000 revolutions per minute.

Preferably the lenses 3, 4 focus the collimated beam in the rofile plane 10 through the rod 7 so as to ensure a sharp cut-off of the beam at the edges of the rod. A corresponding sharp edged signal is then generated by the beam in the detector 9 which leads to improved measuring accuracy.

A second beam is produced by the splitter plate 2 which passes through two lenses 11, 12, is turned through 180° by two glass prisms 13 and 14, and is directed along a second axis perpendicular to said first axis and passing through a linear diffraction grating 15 and the central axis 0 of the glass block. This second beam is scanned in a parallel manner by the glass block in the same manner as the first beam, and is furthermore scanned in unison with the first beam because of the symmetry of the two beams and the glass block, which can be easily appreciated from FIG. 1. The scanned beam is incident normally on a second linear diffraction grating 16 with its ruled lines parallel to those of grating 15 and is focused by a lens 17 onto a photo-detector 18.

The periodic spacing interval of the lines ruled on both gratings 15, 16 is the same and is 0.1 millimetres. The diameter of the second beam as incident on the first grating is determined by the lenses 11, 12 and is about 1 centimetre. Thus the second beam covers about 100 lines on the grating 15. As the light passes through these lines on the grating 15, it is diffracted and the transmitted beam consists of a zero order diffracted beam which continues along the axis and first and higher order diffracted beams which are inclined to either side of the axis. Of the higher order diffracted beams only the first order beams are of any significant intensity and these are inclined at a very small angle to the zero order. Thus, as the light passes on through the glass block 5 to the second diffraction grating 16 it continues as a single beam and forms a light spot of about 1 centimetre diameter on the second grating 16. The light now passes through the second grating 16 and is again diffracted in the process. Each of the zero and first order diffracted beams is diffracted to form further secondary zero and first order diffracted beams which are focused by the lens 17 at its focal plane 19.

The diffraction spectrum formed in the plane 19 consists of a zero order diffraction spot on the axis and higher order diffraction spots spaced on either side of the zero order spot. The zero order spot is the most intense but as the beam scans the grating 16, the intensity of this spot varies gradually with a period much greater than the line spacing interval of the gratings. However, the first order spots are found to vary in intensity in a cyclic manner and strictly in step with scanning movement of the beam over the second grating, a complete modulation cycle or pulse being produced each time the beam scans over a distance of one grating line interval of 0.1 millimetres on the grating 16. The photodetector 18 is positioned slightly off axis to receive light from one of these first order diffraction spots and to produce a corresponding pulsed signal. A mask serves to cut out light from all of the other diffraction spots except the first order one.

Figure 2:
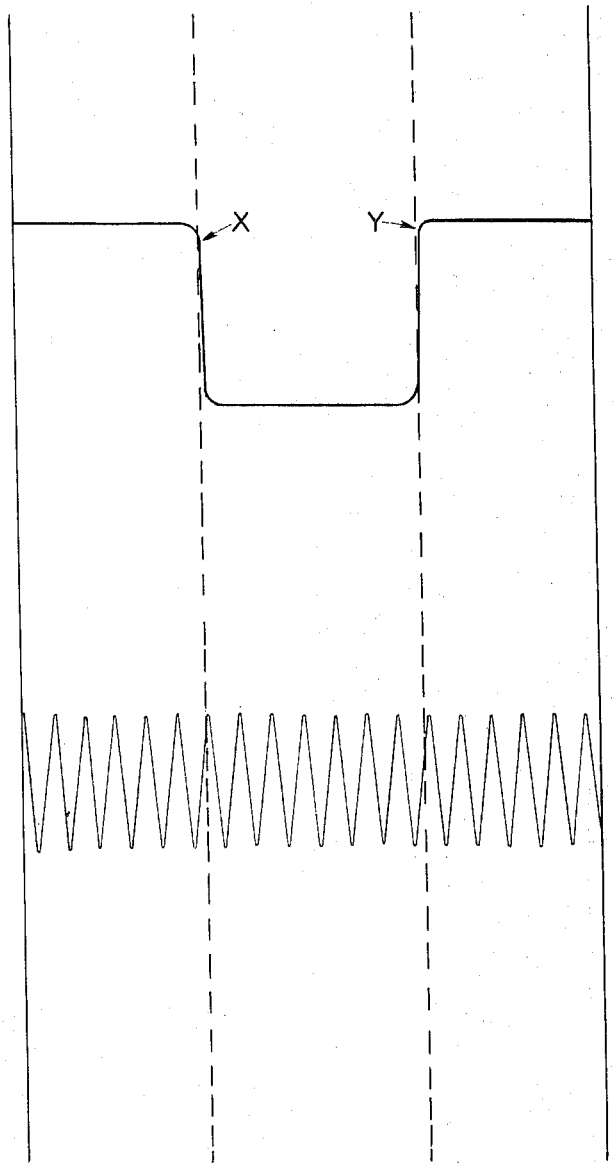
FIG. 2 shows the form of the profile signal and pulsed measuring signal generated by the two beams in the gauge of FIG. 1.

FIG. 2 of the accompanying drawings illustrates the form of the signals which are generated in the photodetectors 9 and 18 for a complete scan of both beams. The edges X and Y of the upper signal generated in detector 9 correspond to the edges of the rod 7 at which transmission of the first beam is interrupted and then resumed. The lower signal generated in detector 18 consists of a regular series of pulses corresponding to successive line intervals on the grating 16 which are traversed by the second beam. Because both beams scan in unison a scanning movement of the first beam across the profile plane 10 by a distance corresponding to one grating interval will always produce a corresponding pulse in detector 18. Thus, the grating 16 calibrates the measuring space scanned by the first beam and allows the width of the rod to be calculated in terms of the number of pulses generated in the detector 18 in the interval between the edges X and Y of the pulse generated in the detector 9. A logic gate 20 is fed these two signals and serves to gate the pulsed measuring signal under the control of the profile signal. so that the pulses between X and Y pass to a counter 21 which produces a corresponding width measurement.

The accuracy of width measurements made with the profile gauge of FIG. 1 is basically dependent on the accuracy of the lines ruled on the gratings and the optical quality of the glass block 5, both of which are invariable and can be readily controlled. The accuracy of the width measurements is completely independent of the scanning speed of the beams. Imperfections in the body of the glass block or in the flatness of its faces will cause differences in the manner in which the two beams are scanned. The effect of such differences can be reduced however, by averaging the results of successive scans of the beams. Averaging not only improves the statistical accuracy of the final result but also, because of the very nature of operation of the block 5, causes errors in successive measurements to cancel one another out. This occurs because each face of the block in turn refracts one beam and then the other and will, if imperfect, cause similar refraction errors in each case, but these refraction errors are found to result in measurement errors in an opposite sense in each case so that they cancel one another on being averaged. Cancellation is substantially complete if the grating 16 and the profile plane 10 of the rod 7 are equidistant from the axis of rotation 0 of the block. Typically, 100 successive scans are averaged in the counter 21 and that averaged measurement which is presented is accurate to within ± 0.001 percent.

An important condition which must be met in setting up the gauge is to ensure that the second beam, once diffracted by the first grating 15, passes on to the second grating 16 effectively as a single beam rather than being split into a number of separate zero and higher order diffracted beams. Parameters which effect this condition are the frequency of the light and the line spacing interval of the gratings 15, which determine the diffraction angle, and the path length of the beam between the two gratings 15, 16. The path length in turn will have a lower limit set by the dimensions of the glass block 5. A large block which gives a correspondingly large scanning range to measure large diameter rods 7, will set a fairly high minimum path length and thus the line spacing interval of the gratings will have to be made correspondingly larger to give smaller diffraction angles for a set light frequency. This in turn means that the unit of measurement, which is equal to the line spacing interval, is larger and measurements are slightly less accurate, although the accuracy obtained is still of a high degree. Typically, in the illustrated system the two gratings might be spaced 25 centimetres apart and the glass block 5 would have a side of 15 centimetres thereby giving a scanning range of about ⅔ × 15, i.e., 10 centimetres. The focal length of the lens 17 is typically of the order of 40 centimetres and the first order diffraction spots are spaced 2½ millimetres from the axis. A gauge having these dimensions and in which the block 5 is rotated at 5,000 revolutions per minute would give an averaged measurement over 100 scans every ¼ second.

Figure 3:
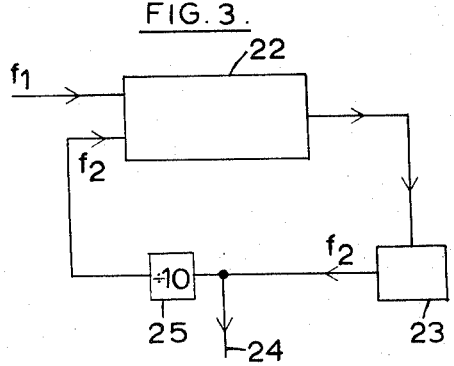
FIG. 3 shows a modification to the gauge of FIG. 1.

Accuracy of width measurements can also be further improved by operating on the signal from the photodetector 18 so that sub-intervals of the basic pulse interval can be counted. This may be done by analysing the amplitude of the signal and using it to trigger pulses at a higher frequency. Alternatively, means may be employed to increase the repetition frequency of the signal in a known ratio. Such means is illustrated in FIG. 3 comprising comparator means 22 which has two inputs, one of which receives the pulsed measuring signal $f_1$ from the detector 18, and an adjustable frequency oscillator 23 which has a free running frequency of approximately ten times that of $f_1$ and which has its frequency controlled by a difference signal from the comparator 22, which signal corresponds to the difference in frequency between signals at the inputs of the comparator. The output signal from the oscillator 23 is fed to a divide unit 25 which produces an output signal with a frequency one tenth that of the input signal. This output signal is then fed to the second input of the comparator means 22.

The nature of this arrangement is such that provided the divided frequency of the signal $f_2$ is within 30 percent of that of $f_1$ the comparator means 22 produces a difference signal which adjusts the frequency of the oscillator 23 so that it is exactly 10 times that of $f_1$. Thus, the frequency of $f_2$ is locked-on to a frequency 10 times that of $f_1$. This signal is tapped at 24 and used as the pulsed measuring signal which is supplied to the logic gate 20 and counter 21 of FIG. 1. By these means the measuring resolution of the gauge is increased by a factor of 10.

Figure 4:
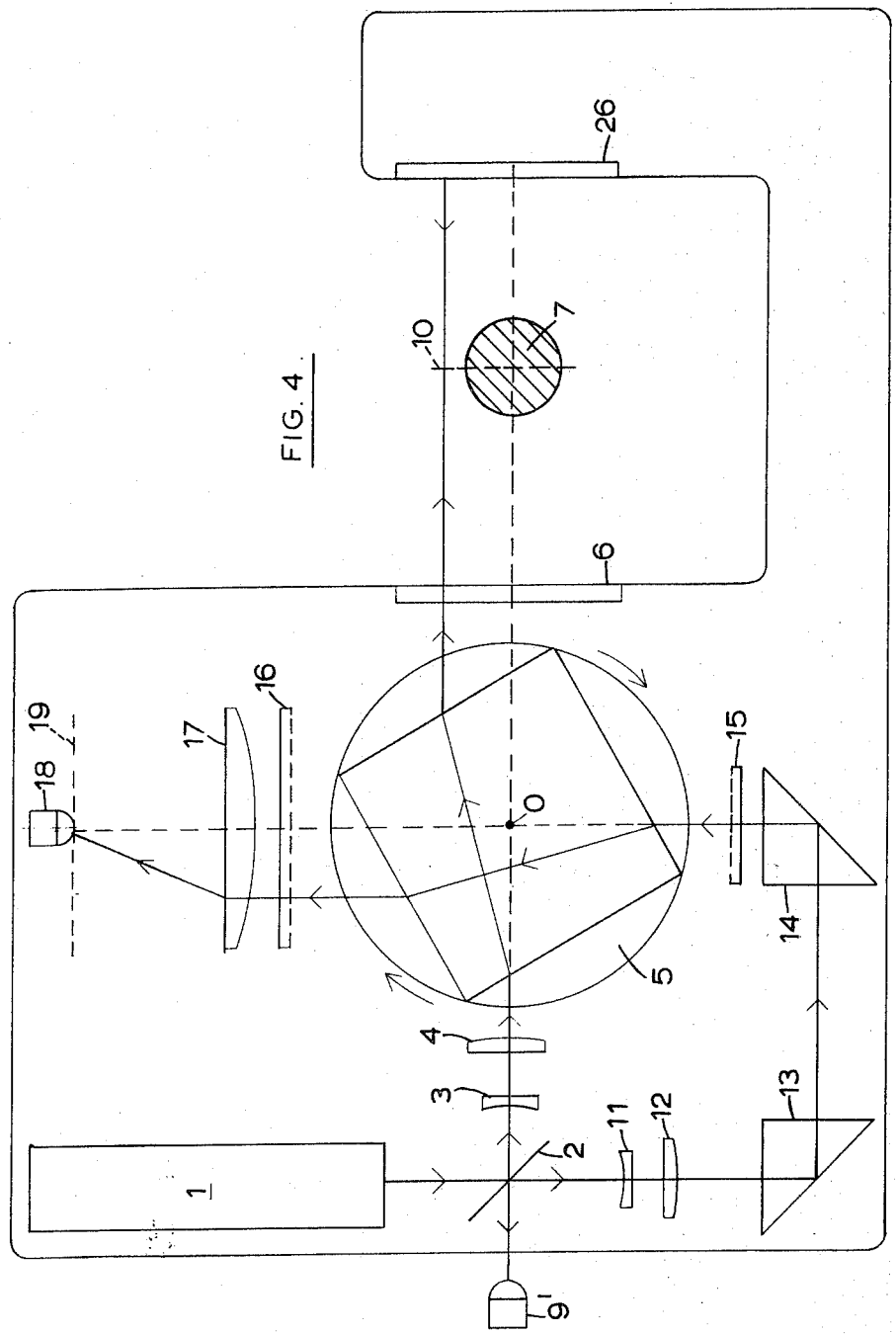
FIG. 4 is a plan view of an alternative embodiment of the invention.

A modified form of the profile gauge of FIG. 1 is shown in FIG. 4 in which the lens 8 and photo-detector 9 have been replaced by a planar mirror 26 which reflects the first beam back on itself through the glass block 5 onto a photo-detector 9' behind the splitter plate 2. In this arrangement the reflected beam is "unscanned" by the glass block 5 and there is no need to provide a lens to focus the beam onto the photo-detector 9'. Such a gauge is particularly suitable for use under industrial conditions where space behind the rod is restricted and is not sufficient for a lens and photo-detector. The signals generated in the two detectors 9' and 18 are fed to a logic gate and counter as in FIG. 1, and are used to give width measurements.

Figure 5:
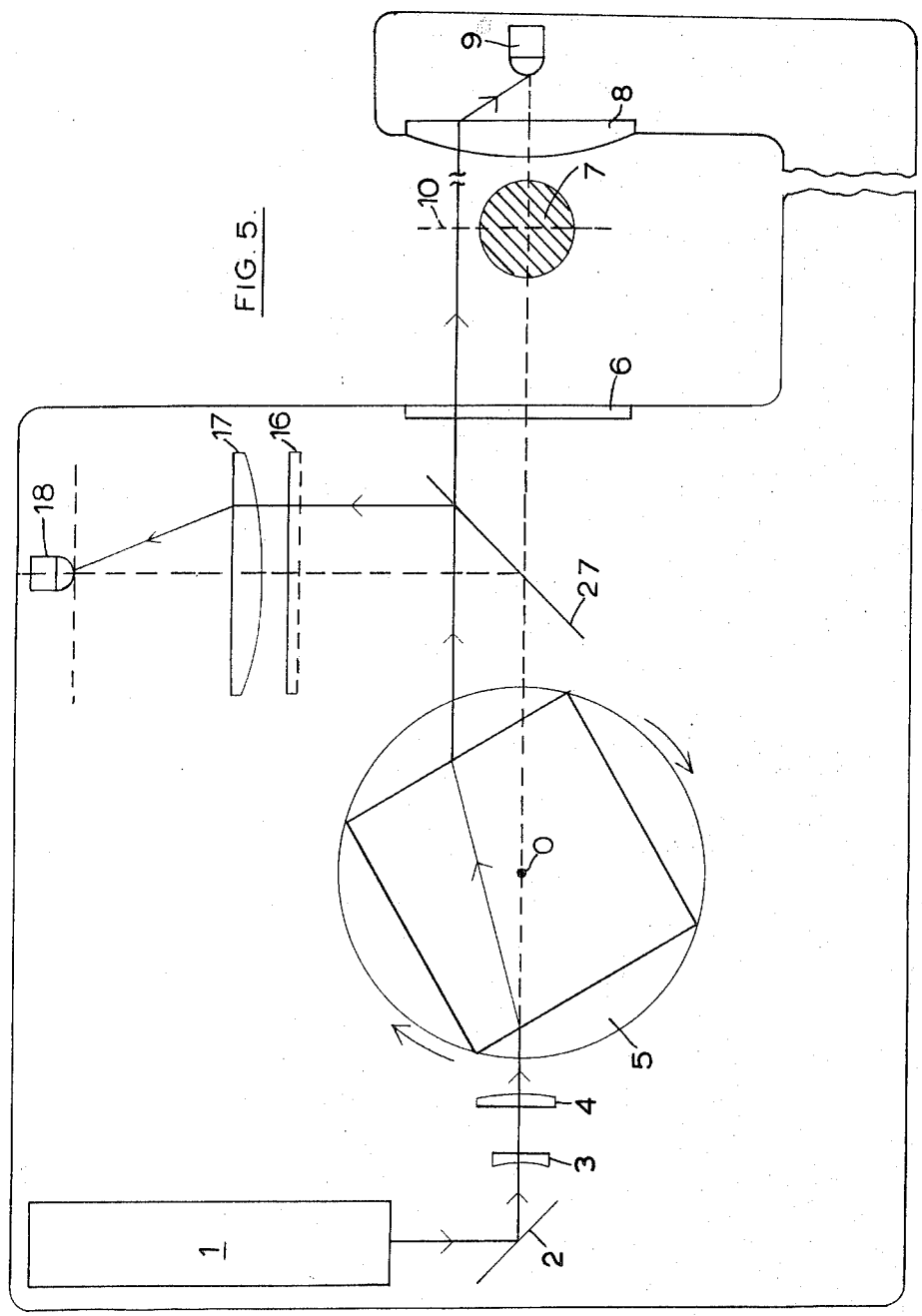
FIG. 5 is a plan view of another alternative embodiment of the invention.

An alternative profile gauge according to the invention is shown in FIG. 5 of the drawings in which a single beam is scanned by a rotating glass block 5 as in the gauge of FIG. 1, but in which this scanned beam is split into two beams by a splitter plate 27 before the window 6. A first one of these beams passes on through the window 6 and the second beam is directed at right angles to the first towards the grating 16. With this arrangement the scanning movements of both beams are bound to be identical. The two lenses 3, 4 are used to adjust the diameter of the beam, this adjustment then determining the diameter of both of the scanned beams beyond the splitter plate 27.

In this gauge no use is made of diffraction by the grating 16. Instead, the diameter of the beam is adjusted until it is fine enough to be transmitted by just one line of the grating at a time. Successive lines on the grating then chop the beam into light pulses as it scans the grating and these light pulses generate a corresponding pulsed signal in the detector 18. However, because the two beams scan in unison the effect of this pulsed signal is exactly the same as in the gauge of FIG. 1, the pulses serving to calibrate the profile plane 10 through the rod 7. A logic gate and counter are used to gate and count the pulses as illustrated and described with reference to the gauge of FIG. 1.

A disadvantage of this alternative form of profile gauge is that the finer beam is more susceptible to being blocked by dirt on the grating 16 thus resulting in distortions in the pulse signal which lead to measuring errors.

In describing the invention above we have assumed that the rod which is to be measured remains stationary. However, this may not be true in practice, especially if the gauge is being used for continuous monitoring of rod-like material at it is being manufactured or processed. Movements of the rod in the axial direction of the beam do not cause any particular difficulty but movements of the rod in the profile plane cause errors in the width measurements. This is a problem which is met with in all of the known profile gauges.

Faster scanning of the beam across the rod helps to reduce such errors, and this is most easily achieved using rotating or oscillating mirrors to scan the beam, these being lighter than glass blocks. Averaging the results of successive width measurements is also found to reduce such errors as movements of the rod over a period tend to cancel one another out.

Figure 6:
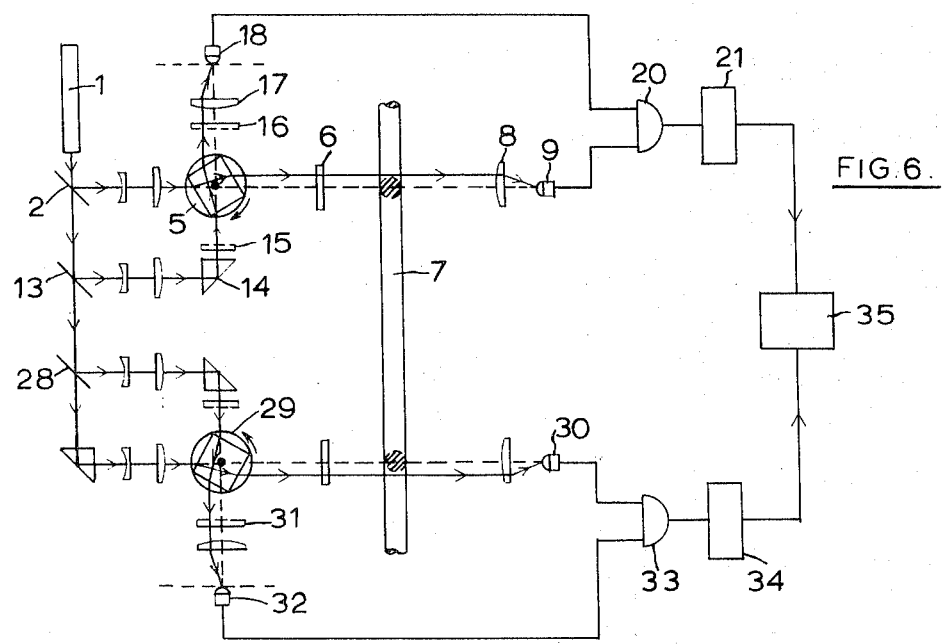
FIG. 6 is a plan view of yet another embodiment of the invention.

Another approach which can be applied to overcome errors due to rod movement comprises employing two profile gauges according to the invention each of which scans the rod in an opposite direction to the other and gives a separate width measurement. The width measurements obtained are then averaged. A profile gauge which embodies this idea is illustrated in FIG. 6 and comprises the gauge of FIG. 1 as shown in the upper part of the drawing, and a second similar gauge as shown in the lower part of the drawing which uses the laser 1 of the first gauge as the light source.

In the first gauge a splitter plate 13 is used in place of the prism 13 in FIG. 1, and the beam from laser 1 which is transmitted through the splitter plate passes on to a splitter plate 28 of the second gauge which forms the two beams of that gauge. These two beams are processed in the same way as in the first gauge, both being scanned by a square section glass block 29, and one scanning the rod 7 nd generating a profile signal in a photo-detector 30, and the other scanning a grating 31 and producing a pulsed measuring signal in a photo-detector 32. The block 29 is rotated at the same speed as the block 5 of the first gauge but the blocks rotate in opposite directions, as indicated in FIG. 6, so that the two beams scanning the rod 7 always move in opposite directions and reach the limits of their respective scans together. One beam scans the rod 7 at one point and the other beam scans the rod 7 at a different point slightly further along its length.

A logic gate 33 receives both of the signals from the detectors 32, 30 and gates pulses to a counter 34 which gives corresponding width measurements. Width measurement signals are delivered from the counters 21, 34 of both gauges to an electronic averaging unit 35 which gives final averaged width measurements.

Figure 7:
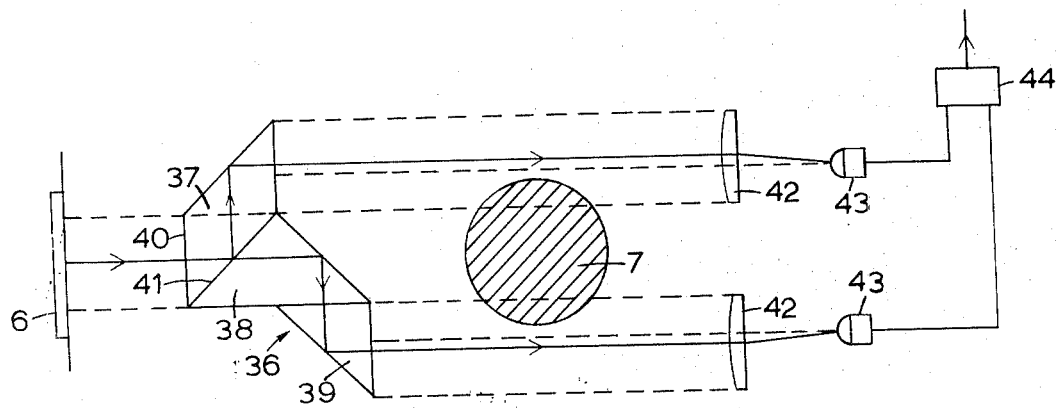
FIG. 7 illustrates a modification to the gauge of FIG. 1 which increases its diameter measuring range.

As already indicated above, the scanning range of the beam scanning the rod is determined by the dimensions of the rotating scanning blocks. This can be a serious limitation when it is required to measure large widths and the modification illustrated in FIG. 7 is designed to overcome this difficulty. The modification comprises an optical beam splitting device which is introduced in the path of the scanned beam before the profile plane 10. The device consists of three geometrically shaped glass portions 37, 38, 39 shown in FIG. 7. One portion 37 has a rhomboid section with an internal acute angle of 45° and has a face 40 on which the scanned beam is incident normally during its scan. An adjacent inclined semireflecting surface 41 of the portion 7 splits the beam into two beams, one of which is reflected internally across portion 37 to one side of the incident beam, and the other of which passes into the portion 38 with an isosceles triangle cross-section and is reflected internally from an inclined side thereof to the opposite side of the incident beam. The first component beam is then reflected internally in portion 37 again and passes out towards the profile plane 10 parallel to the incident beam, and the second component beam passes into the portion 39 and is reflected internally so that it also passes out towards the profile plane 10 parallel to the incident beam. The two final parallel component beams are spaced apart by a distance equal to twice the width of the face 40 and scan in unison with the incident beam so that they together scan across a portion of the profile plane which has a width three times the width of face 40.

Each of these component beams is used to detect an edge of an object in the profile plane. The object 7 has to be at least approximately centred on the direction of the incident beam and has to have a width greater than the width of face 40 but less than three times the width of face 40. When these conditions are met each component beam in turn is cut-off by a respective edge of the object as the beams scan the profile plane. A separate lens 42 focuses each of the component beams onto a separate photo-detector 43 and the edge signals generated in the detectors 43 are delivered to an electronic unit 44 which uses them to produce a corresponding profile signal such as shown in FIG. 2. This signal is used to give width measurements as in the gauge of FIG. 1.

In the gauges described above the light source is a laser but it will be appreciated that any source which provides a collimated monochromatic light beam is suitable. Further, it will be appreciated that the term "light" is used in the claims to include radiation with a frequency outside of the visible frequency range.

Similarly, the scanning system described above consists of a square section glass block, but it will be appreciated that other parallel-faced blocks having more than four faces and made from glass or other light refracting material can be used. Alternatively, rotating or oscillating mirrors can be used to scan the beam.

I claim:

1. A profile gauge comprising a light source which produces a first beam of light; scanning means which scans said first beam of light in a parallel manner across a measuring space in which an object to be measured is to be disposed; first light detecting means which is disposed to receive said first beam when it is not interrupted by an object in said measuring space and which produces a profile signal which varies in amplitude with the intensity of said beam; a monochromatic light source which produces a second beam of light; a first diffraction grating through which said second beam passes in a fixed direction and which diffracts said second beam; scanning means which is disposed in the path of said second beam from the first diffraction grating and which scans said second beam in a parallel manner in synchronism with said first beam; a second diffraction grating which is disposed in the path of said second scanned beam of light so that it is scanned thereby and further diffracts said second beam so as to produce a diffraction spot in a detection plane; second light detecting means which is disposed to receive the light from said second beam forming said diffraction spot and which produces a corresponding pulsed measuring signal continuously during scanning of the second beam, each pulse produced corresponding to a scanning movement of the second beam by one line spacing intervals across said second grating; gating means which gates said pulsed measuring signal under the control of said profile signal; and counting means which counts the pulses in said gated measuring signal and produces corresponding width measurements.

2. A gauge as claimed in claim 1 in which the periodic line spacing interval of both gratings is the same and the width of the beam is such that it covers a plurality of line intervals on both gratings, the beam transmitted by said additional grating remaining effectively as a single beam comprising several component diffracted beams between the two gratings.

3. A gauge as claimed in claim 2 in which the two gratings and the lines ruled on them are parallel to one another, and the beam is incident on them normally.

4. A gauge as claimed in claim 1 in which the two beams are scanned by the same scanning means.

5. A gauge as claimed in claim 4, in which the scanning means comprises a parallel sided block of light refracting material of regular polygonal cross-section through which both light beams pass, the block being mounted to rotate about an axis through the centre of the block parallel to its sides and the light beams being directed at the sides of the block along fixed axes normally to the axis of rotation.

6. A gauge as claimed in claim 5 in which the block has a square cross-section and the two beams are directed at right angles to one another.

7. A gauge as claimed in claim 5 in which the first beam if it is not interrupted by an object is reflected by a mirror after traversing said measuring space and retraces its path back through said block to said first light detecting means which takes the form of a photo-detector.

8. A gauge as claimed in claim 1 which includes focusing means that focuses said first beam in the profile plane through an object to be measured.

9. A gauge as claimed in claim 1 in which both of said light sources are provided by a single monochromatic light source.

10. A gauge as claimed in claim 1 in which the pulsed measuring signal is increased in frequency by electronic means.

11. A gauge as claimed in claim 10 in which said electronic means comprises an adjustable frequency oscillator, a frequency divider unit which receives the signal from the oscillator and divides it by a preset factor, and comparator means which receives the signal from the divider unit and the pulsed measuring signal and which produces an output signal which is dependent on the difference in frequency between the two input signals and which adjusts the frequency of the oscillator so that it is higher by said preset factor than the frequency of the pulsed measuring signal, the output signal from the oscillator being used as the new higher frequency pulsed measuring signal which is supplied to said gating means.

12. A gauge as claimed in claim 1 which further includes an optical beam splitting device in the path of the first beam between the scanning means and the measuring space, which device is adapted to split the beam into two parallel beams which scan the measuring space in unison with the incident beam, said first light detecting means comprising a separate lens and detector associated with each beam so that the respective lens focuses the beam onto the respective detector after it has traversed the measuring space, the two detectors thereby producing separate signals which indicate the presence of a respective edge of the object and which are fed to means which processes them to form said profile signal.

13. A gauge comprising two gauges as claimed in claim 1 which operate sinultaneously to measure the width of an object; and means to average the measurements which they make; the scanning means which scans the first beam in each gauge being adapted so that the two beams are parallel and scan in unison but with the beams always moving in opposite directions to one another.

14. A gauge as claimed in claim 13 in which the two beams in each gauge are scanned by the same scanning means which takes the form of a parallel sided block of light refracting material of regular polygonal cross-section and which is rotated about an axis through its centre parallel to its sides, the two blocks being rotated at the same speed but in opposite directions.

15. A profile gauge comprising light source means which produces first and second beams of light; scanning means in the form of a parallel sided block of light refracting material of regular cross section through which both beams pass, the block being mounted to rotate about an axis through the centre of the block parallel to its sides and the beams being directed at the sides of the block along fixed axes normal to the axis of rotation so that each beam is scanned in a parallel manner and both beams are scanned in synchronism, the first beam scanning across the measuring space in which an object to be measured is to be disposed; first light detecting means which is disposed to receive said first beam when it is not interrupted by an object in said measuring space and which produces a profile signal which varies in amplitude with the intensity of said beam; a diffraction grating which is disposed in the path of said second scanned beam of light so it is scanned thereby; second light detecting means which is disposed to receive light from said second beam after it has passed through said grating and which produces a pulse measuring signal continuously during scanning of the second beam, each pulse produced corresponding to a scanning movement of the second beam by one line spacing interval across the grating; gating means which gates said pulsed measuring signal under the control of said profile signal; and counting means which count the pulses in said gated measuring signal and produces corresponding width measurements.

* * * * *